3,029,252
OMEGA-HYDROPOLYFLUOROPERHALO-
ALKANONES AND KETALS THEREOF
Howard E. Simmons, Jr., Wilmington, Del., assignor to
E. I. du Pont de Nemours and Company, Wilmington,
Del., a corporation of Delaware
No Drawing. Filed Apr. 23, 1958, Ser. No. 730,281
10 Claims. (Cl. 260—340.9)

This invention relates to, and has as its principal object provision of, a new class of polyfluoroketones, i.e., certain polyfluoroalkanones, and the ketals thereof.

This application is a continuation-in-part of my copending application Serial Number 647,752, filed March 22, 1957, and issued November 3, 1959 as U.S. Patent No. 2,911,414.

Certain polyfluoroketones are known which exhibit interesting chemical and physical properties. However, those presently known suffer from two conflicting effects. Thus, as the degree of fluorine substitution for hydrogen on carbon increases, the chemical reactivity of the compounds decreases, but at the same time the boiling point decreases. This latter effect seriously hinders use of the compounds in those fields where the first effect, i.e., decreased chemical reactivity, would indicate major potential usefulness, e.g., as stable liquids, heat transfer media, and the like. On the other hand, the known ketones with decreasing fluorine substitution for hydrogen on carbon, while admittedly having higher boiling points, are markedly more chemically reactive. This is especially true for the hydrogen-bearing polyfluoro-substituted ketones thus far reported which are all of the acetone series and in which all such hydrogens are on carbon alpha to the ketone carbonyl group.

A new class of polyfluoro-substituted ketones and the ketals thereof has now been discovered which have both excellent chemical resistivity, i.e., inertness, and superior physical properties in the sense of markedly higher boiling points at any given carbon content. These new ketones are ω-hydropolyfluoroperhaloalkanones having at least two chain carbons in each carbon chain radical pendent on ketone carbonyl, and having only fluorine or perfluorocarbon substituents, preferably the former, on each α-carbon of both said radicals. Thus, these new ketones can be schematically represented by the following structure:

$HR_xCOR_xH$ and preferably $HR'_xCF_2COCF_2R'_xH$ wherein the $R_x$ radicals, which can be alike or different, are divalent, saturated, wholly carbon-chain perhalopolyfluorocarbon radicals of 2–31 carbons, and the $R'_x$ radicals, otherwise similar to the $R_x$ radicals, have 1–30 carbons, i.e., $R'_x$ equals $R_x$ less an alpha-$CF_2$-group. Preferably the $R_x$ and $R'_x$ radicals are respectively identical and contain no more than 11 (or 10) carbons each and the halogen substituents are of atomic number 9 to 17. In each instance the hydrogen is an omega hydrogen, i.e., attached to the catenic carbon farthest removed from the carbonyl carbon. The most outstanding of these new ω-hydropolyfluoroperhaloketones are the ω-hydroperfluoroketones of from five to about twenty-five carbons.

The new ketals of these ketones include generically both the acyclic and cyclic ketals. These two closely related types of ketals can be represented by the following structures:

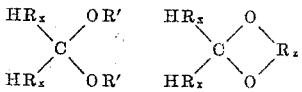

and preferably

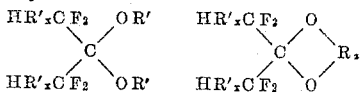

wherein the $R_x$ and $R'_x$ radicals, which can respectively be alike or different, have their previous significance and the two $R^1$ radicals, which also can be alike or different, are discrete monovalent hydrocarbon radicals in which any substituent is halogen, and $R_z$ is a divalent hydrocarbon radical or halogenohydrocarbon radical. Generally the $R'$ radicals are of no more than eighteen carbons apiece, and the divalent $R_z$ radical is of no more than twelve carbons and of up to four chain carbons between the free valences, i.e., so as to form with the two indicated ketal oxygens and the intervening annular carbon therebetween a cyclic ketal structure of from four to seven ring members. Preferably the $R'$ radicals contain no more than twelve carbons each and most preferably contain a total of no more than eighteen carbons, and the divalent radical $R_z$ contains no more than nine carbons and forms with the two indicated ketal oxygens and the intervening annular carbon therebetween cyclic ketal structures of from five to six ring members. These new acyclic and cyclic ketals of these ω-hydropolyfluoroperhaloketones are particularly outstanding, even over the ketones themselves, for their extreme chemical and physical stability.

These new ketones can be made by an extension of the Hauptschein et al. synthesis (see U.S. 2,802,034) by the reaction between an alkali metal and a hydrocarbyl ester of the corresponding ω-hydropolyfluoroperhalocarboxylic acid. However, this method is not preferred since yields and conversions are relatively low. These new ω-hydropolyfluoroperhaloketones can likewise be prepared as disclosed in the copending application of Wiley, application Serial No. 730,266, filed concomitantly, in much higher yields and conversions by the reaction between an alkali metal alkoxide and a hydrocarbon ester of the requisite ω-hydropolyfluoroperhalocarboxylic acid followed by acidification.

The new acyclic and cyclic ketals, while exhibiting common areas in their physical and chemical properties and behavior, must be prepared by somewhat related but still distinct procedures. Thus, the acyclic ketals are prepared from the requisite bis-ω-hydropolyfluoroperhaloketone, a monohydric alcohol, an ester of a strong acid and a monohydric alcohol, and a strong inorganic base in accordance with the following equations:

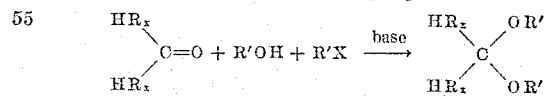

and

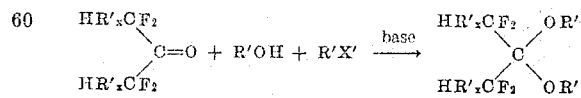

wherein the $R_x$, $R'_x$ and $R'$ radicals have their previous significance and X' is the non-proton radical of: (1) a strong oxygen containing sulfur acid in which case a strong inorganic base must also be present or (2) a hydrohalic acid in which case a silver salt must also be present. On the other hand, the cyclic ketals are prepared by reaction of the requisite bis-ω-hydropolyfluoroperhaloketone under basic conditions with a half ester of a glycol, i.e., a compound of the formula $HOR_zX$, wherein X is the nonproton radical of a hydrogen acid, HX, and $R_z$ has its previous significance, in accord with the following equations wherein $R_x$ and $R'_x$ likewise have their previous significance:

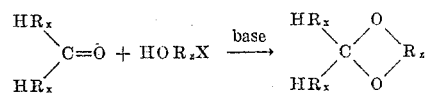

and

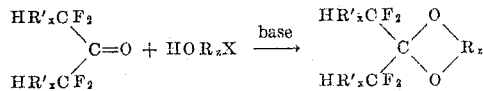

These new ketones and methods for the preparation thereof are further illustrated by the following examples in which parts are by weight, but the invention is not so limited.

*Example I*

To a suspension of 11.2 parts of potassium t-butoxide in 53.0 parts of anhydrous diethyl ether was added over a four-minute period 54.4 parts (2 molar on the butoxide) of ethyl 5H-octafluorovalerate. A gentle reflux occurred during the addition of the first half of the ester at room temperature. The resulting reaction mixture was allowed to stand for ten days at room temperature under a dry nitrogen atmosphere and then was added with stirring to an excess of 2 N sulfuric acid. The resultant reaction mixture was extracted with 106 parts of diethyl ether. The ether extracts were concentrated by distillation of the diethyl ether therefrom. The resultant oily mixture of the organic reaction products was purified by distillation through a precision fractionation column whereby there was obtained 9.7 parts (55% of theory at 40% conversion) of 1,9-dihydroperfluoro-5-nonanone, i.e., 1H,9H-hexadecafluoro-5-nonanone, as a clear, colorless liquid boiling at 69–78° C. at reduced pressures ranging from 60 to 52 mm. of mercury. The pure ketone boils at 147° C. at atmospheric pressure; $n_D^{25}$, 1.3092. The infrared and nuclear magnetic resonance spectra are consistent with the dihydrohexadecafluorononanone structure.

*Analysis.*—Calcd. for $C_9H_2F_{16}O$: C, 25.1%; H, 0.5%; F, 70.7%. Found: C, 24.8%; H, 0.9%; F, 70.6%.

*Example II*

To a suspension of 9.0 parts of sodium methoxide in 35.0 parts of anhydrous diethyl ether was added over a 15-minute period 59.8 parts (2 molar on the methoxide) of ethyl 3H-tetrafluoropropionate. The resulting reaction mixture was allowed to stand for three days at room temperature under a dry nitrogen atmosphere and was then added with stirring to an excess of 2 N sulfuric acid. The organic reaction products were extracted from the reaction mixture using a continuous ether extractor. The ether was then removed from the extract by distillation, and the resultant oily mixture of the organic reaction products was purified by distillation through a precision fractionation column whereby there was obtained 4.8 parts (60% of theory at 20% conversion) of the hydrate of 1,5-dihydroperfluoro-3-pentanone, i.e., 1H,5H-octafluoro-3-pentanone, as a clear, colorless liquid boiling at 130–132° C. at atmospheric pressure; $n_D^{25}$, 1.3094. The infrared and nuclear magnetic resonance spectra were consistent with dihydrooctafluoropentanone hydrate structure.

*Example III*

To a solution of 47.2 parts of ethyl ω-hydroperfluoro-nonanoate, i.e., ethyl 9H-octadecafluorononanoate, in 25 parts of anhydrous diethyl ether was added with stirring 2.8 parts (0.5 molar on the ester) of sodium methoxide. The resulting cloudy solution was heated on a steam bath to remove the diethyl ether. The last traces thereof were removed by pumping under reduced pressure, and the resulting thick reaction mixture was allowed to stand overnight at room temperature. The volatile products were then removed by heating on a steam bath under reduced pressure (12 mm. of mercury). There was thus obtained 3.9 parts of volatile liquid by-products, which were shown by infrared spectra to be a mixture of dimethyl, methyl ethyl, and diethyl carbonates.

The nonvolatile, viscous, liquid residue was taken up in 35 parts of diethyl ether and five parts of concentrated sulfuric acid was added with stirring to the solution. The resultant precipitate of inorganic salts was removed by filtration, and the solid precipitate was washed well with 70 parts of diethyl ether. The ethereal filtrate and ether washings were combined and treated with about eight parts of phosphorus pentoxide. The solids were then removed by filtration, and the ethereal filtrate concentrated under reduced pressure by distilling off the diethyl ether. The remaining oily organic product was separated by fractionation in a short-path Hickman still under reduced pressure. A liquid product was collected at 60° C. under a pressure corresponding to 0.4 mm. of mercury and a sublimate at 90° C. under a pressure corresponding to 0.4 mm. of mercury.

The liquid distillate and the solid sublimate were combined, taken up in diethyl ether, and again dried over phosphorus pentoxide. The ether was removed by distillation under reduced pressure, and the remaining organic residue was purified by fractionation through a spinning band distillation column (U.S. Patent 2,712,520). There was thus obtained 14 parts of recovered, mixed methyl and ethyl 9H-octadecafluorononanoates boiling at 91–100° C. under a pressure corresponding to 11 mm. of mercury and crude 1,17-dihydroperfluoro-9-heptadecanone as a clear, colorless liquid boiling at 143–148° C. under a pressure corresponding to 11 mm. of mercury and melting at 56–60° C. at atmospheric pressure. The crude ketone was redistilled through a short-path Hickman still with a steam-heated receiver to maintain liquid condition and then still further purified by sublimation at atmospheric pressure. There was thus obtained 14.2 parts (70% of theory at 58% conversion) of pure 1,17-dihydroperfluoro-9-heptadecanone, i.e., 1H,17H-dotriacontafluoro-9-heptadecanone, as white needle crystals melting at 63–64° C.

*Analysis.*—Calcd. for $C_{17}H_2F_{32}O$: C, 24.6%; H, 0.2%; F, 73.3%. Found: C, 24.5%; H, 0.8%; F, 73.0%.

The infrared spectrum of the pure ketone exhibited a relatively weak carbonyl absorption peak at 5.56 micron. The dihydroperfluoroheptadecanone is quite soluble in alcohols, ethyl acetate, and ethers but only sparingly soluble in cold chloroform and benzene. In solution in ethanol, the ketone forms an ethyl hemiketal which upon titration with sodium hydroxide indicates a neutral equivalent of 842 (theory, 830).

*Example IV*

To a suspension of 5.2 parts of sodium methoxide in 70 parts of anhydrous diethyl ether was added 114.8 parts (2 molar on methoxide) of ethyl ω-hydroperfluoroundecanoate, i.e., ethyl 11H-eicosafluoroundecanoate. The resulting reaction mixture was refluxed under dry nitrogen for 140 hours with stirring and then was treated with 5.1 parts of concentrated sulfuric acid. The resulting precipitate of inorganic salts was removed by filtration and was carefully washed with 140 parts of ether. The ethereal filtrate and washings were combined and concentrated by distillation to remove the diethyl ether. The volatile reaction products were removed by distillation under reduced pressure into a trap cooled with a solid carbon dioxide/acetone bath. There was thus obtained six parts of by-product methyl and ethyl carbonates. The viscous liquid residue remaining after removal of the volatile materials solidified on standing, and there was thus obtained 25 parts of crude 1H,21H-tetracontafluoro-11-heneicosanone.

The crude ketone was converted to a dimethyl ketal by taking up in methanol and treating with 25 parts of dimethyl sulfate and 25 parts of potassium carbonate. The resulting reaction mixture was allowed to stand at room temperature for two hours and then poured into 500 parts of water. The organic reaction products were extracted from the mixture with 70 parts of diethyl ether. The ether was removed from the ether extract by distillation, and the resulting organic residue purified by distillation through a precision fractionation column. There was thus obtained 3.4 parts of recovered ethyl 11H-eicosafluoroundecanoate as a clear, colorless liquid boiling at 118° C. at a pressure corresponding to 9 mm. of mercury, and the dimethyl ketal of 1H,21H-tetracontafluoro-11-heneicosanone as a clear, colorless liquid boiling at 165° C. at a pressure corresponding to 0.1 mm. of mercury. The ketal on standing solidified to a waxy solid melting at 92–97° C. Sublimation and resublimation of the dimethyl ketal afforded the pure dimethyl ketal as white needles melting at 99–100° C. The infrared spectrum of the pure 1H,21H-tetracontafluoro-11,11-dimethoxyheneicosane was consistent with the ketal structure and showed no absorption in the carbonyl region.

*Analysis.*—Calcd. for $C_{23}H_8F_{40}O_2$: C, 25.7%; H, 0.7%; F, 70.6%; M.W., 1076. Found: C, 26.0%, 26.1%; H, 1.0%, 0.9%; F, 70.2%, 70.4%; M.W., 935, 1010.

*Example V*

To 4.6 parts of large sodium shot (size of green peas) covered with about 50 parts of anhydrous diethyl ether was added with stirring under a dry nitrogen atmosphere and while maintaining the temperature at 10° C., 54.8 parts (equimolar on sodium) of ethyl ω-hydro-octafluorovalerate. The resulting reaction mixture was stirred for three days at room temperature, at which time the sodium had completely reacted. The black reaction mixture was poured into 150 parts of 3 N sulfuric acid and sufficient water was then added to dissolve the resultant inorganic salts. The resulting aqueous acid solution was extracted with six 70-part portions of diethyl ether. The combined ethereal extracts were dried over anhydrous magnesium sulfate and a small amount of sodium fluoride. Concentration by removal of most of the diethyl ether, followed by a flash distillation, gave 43 parts of crude liquid product. The mobile liquid was distilled through a spinning band column (U.S. Patent 2,712,520) at atmospheric pressure to give 17.3 parts (about 40% of theory) of 95% pure 1H,9H-hexadecafluoro-5-nonanone as a clear colorless liquid boiling at 145° C.; $n_D^{25}$, 1.3200. The nuclear magnetic resonance and infrared spectra were fully consistent with the dihydroperfluoroketone structure contaminated by less than 5% of starting ester, i.e., ethyl 5H-octafluorovalerate. Cold titration with dilute sodium hydroxide to pH 8, followed by rapid acidification of the basic solution to pH 4, extraction with diethyl ether, concentration of the ethereal solution, and subsequent distillation over $P_2O_5$ afforded pure 1H,9H-hexadecafluoro-5-nonanone as a clear, colorless liquid boiling at 147° C. at atmospheric pressure; $n_D^{25}$, 1.3082.

*Example VI*

In a glass reactor fitted with stirring means and suitably protected from atmospheric moisture, a mixture of 5 parts of 1H,17H-dotriacontafluoro-9-heptadecanone and 24.1 parts (five molar proportions based on the ketone) of ethylene chlorohydrin was heated with stirring just below the reflux temperature for 2½ hours. The resultant reaction mixture was cooled to room temperature, and 0.9 part (an equimolar proportion based on the ketone) of anhydrous potassium carbonate was added. Stirring was continued at room temperature for ½ hour and then under gentle heating for another 1½ hours. The resultant reaction mixture was poured, with stirring, over ice and then allowed to warm to room temperature. The resulting solid product was removed from the reaction mixture by filtration. There was thus obtained 4.9 parts (95% of theory) of crude 2,2-bis(8H-hexadecafluoro-n-octyl)-1,3-dioxolane as a white solid, melting at less than 60° C. After two recrystallizations from carbon tetrachloride, there was obtained 3.0 parts of pure 2,2-bis(8H-hexadecafluoro-n-octyl)-1,3-dioxolane as white needle crystals, melting at 50–52° C. The crystallization liquors were concentrated to give an additional 0.7 part of pure 2,2-bis(8H-hexadecafluoro-n-octyl)-1,3-dioxolane as white needles melting at 51–52° C. The infrared spectrum of the purified product was consistent with the 2,2-bis(8H-hexadecafluoro-n-octyl)-1,3-dioxolane structure.

*Analysis.*—Calcd. for $C_{19}H_6O_2F_{32}$: C, 26.1%; H, 0.7%; F, 69.6%. Found: C, 26.2%, 26.0%; H, 0.8%, 0.8%; F, 69.8%, 69.9%.

This invention is generic to the bis(ω-hydropolyfluoroperhalo)ketones, or bis(ω-hydropolyfluoroperhalo)alkanones, and the acyclic and cyclic ketals thereof and especially the acyclic and cyclic hydrocarbon ketals thereof. Particularly preferred classes of these new bis(ω-hydropolyfluoroperhalo)ketones and ketals are exemplified by the following structural formulas:

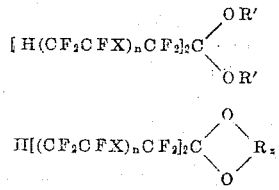

wherein the X's, which can be alike or different, are halogen of atomic number no greater than 17; $n$ is an integer from 1 to 15; and the R's, which may be alike or different, and $R_2$ have their previous significance.

The most preferred bis(ω-hydropolyfluoroperhalo)-ketones and acyclic and cyclic ketals thereof are those of the following structural formulas:

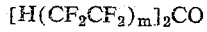

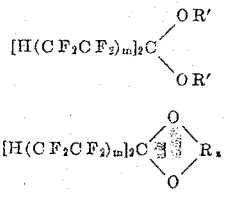

wherein $m$ is an integer from 1 to 7, and preferably from 1 to 5; and the R's, which may be alike or different, and $R_2$ have their previous significance.

As indicated previously these new bis(ω-hydropolyfluoroperhalo)ketones are preferably prepared by the alkali metal alkoxide route currently being claimed in the above-mentioned copending application of Wiley. This process is quite simple and involves reacting at least two molar proportions of an ester of an ω-hydropolyfluoroperhalocarboxylic acid, which acid contains at least three carbon atoms and only fluorine or perfluorocarbyl substituents, preferably the former, on the α-carbon atom, with one molar proportion of an alkali metal alkoxide; acidifying the reaction mixture; and subsequently isolating the ω-hydropolyfluoroperhaloketone.

The reaction is preferably carried out in the presence of an inert liquid reaction medium. A particularly outstanding and convenient medium is anhydrous diethyl ether. Reaction time in this medium at temperatures ranging from room temperature to the reflux of ether (about 35° C.) preferably is of the order of magnitude of four to five days. However, using other reaction media, the temperature of the reaction can be raised and reaction times will accordingly be lower, e.g., di-n-butyl ether, diethyl carbitol, diethyl carbonate. Other suitable reaction media will be found among those organic materials which are sufficiently polar for use as reaction media in the well-known Grignard reaction, such as di-n-butyl ether, tetrahydrofuran, and the like. The reaction can also be carried out with essentially equivalent efficiency, using excess proportions of the ω-hydropolyfluoroperhalocarboxylates as a solvent medium.

The reaction is most usually carried out as a batch process using conventional chemical pots or autoclaves. The reactor in whatever form used should be equipped with suitable means for protecting the reaction system from moisture in any form. The reaction times, as is true of all chemical syntheses, will vary as a function of the reaction temperature. The latter likewise will vary with the nature of the specific ω-hydropolyfluoroperhaloketone being synthesized. Thus, for the shorter chain ketones, the reaction temperature will always be substantially below 100° C. and preferably will be no higher than 50–60° C. Under these conditions for the preparation of the short chain ketones, the reaction times will vary from about four days or so at room temperature to roughly one day at 50–60° C. In the case of the longer chain ketones, i.e., those where each $R_x$ of the preceding formulas contains eight to twelve chain carbons or more, the reaction temperatures will be slightly higher to give an equivalent yield in the same time or else the reaction times will be markedly increased. Even in the case of such higher molecular weight ketones, however, the reaction temperature will preferably not exceed 80–100° C.

In addition to the foregoing detailed disclosures, the following specific examples of the ketone products of the present invention are submitted to further illustrate the invention. Thus, using the above outlined process steps with other specific compounds of the types aforesaid described, there are obtained additional further ω-hydropolyfluoroperhaloketones. For example, using two molar proportions of ethyl 13H-tetracosafluorotridecanoate and one molar proportion of lithium octyloxide, there is obtained bis(12H-tetracosafluorododecyl) ketone, i.e., 1H,25H-octatetracontafluoro - 13 - pentacosanone. From methyl 2H-hexafluoroisobutyrate (two molar proportions) and one molar proportion of sodium methoxide, there is obtained bis(2H-hexafluoroisopropyl) ketone. From two molar proportions of isobutyl 8T-tetradecafluorooctanoate and one molar proportion of lithium ethylate, there is obtained bis(7T-tetradecafluoroheptyl) ketone, i.e., 1H,15H-octacosafluoro - 8 - pentadecanone. From two molar proportions of hexyl 7H-dodecafluoroheptanoate and one molar proportion of sodium isopropoxide, there is obtained bis(6H-dodecafluorohexyl) ketone, i.e., 1H,13H-tetracosafluoro-7-tridecanone. From two molar proportions of propyl 3H,3-chloro-2,2,3-trifluoropropionate and one molar proportion of sodium isobutoxide, there is obtained bis(2H,2-chloro-1,1,2-trifluoroethyl) ketone, i.e., 1,5-dichloro-1,2,2,4,4,5-hexafluoro-3-pentaone. From two molar proportions of butyl 4H-octafluoroisovalerate and one molar proportion of sodium butoxide, there is obtained bis(3H-octafluoroisobutyl) ketone. From two molar proportions of methyl 3H-octafluoropivalate and one molar proportion of potassium methoxide, there is obtained bis(2H-octafluoroisobutyl) ketone.

Mixtures of the ω-hydropolyfluoroperhalocarboxylate esters, as well as mixtures of the alkali metal alkoxides, can be used. In the case of the former, a mixture of products will be obtained comprising the two symmetrical ketones and the unsymmetrical ketone. Mixtures of the alkoxides have no effect on the nature of the ketone product. Thus, one molar proportion of methyl 3H-hexafluoroisobutyrate and one molar proportion of pentyl 3H,2,2,3,3-tetrafluoropropionate and one molar proportion of sodium propoxide affords a mixture of bis(2H-hexafluoroisopropyl) ketone, bis(2H,1,1,2,2-tetrafluoroethyl) ketone, and 2H,1,1,2,2-tetrafluoroethyl 2H-hexafluoroisopropyl ketone. From one molar proportion of heptyl 11H-eicosafluoroundecanoate, one molar proportion of isobutyl 8H-hexadecafluorooctanoate, and one molar proportion of rubidium methoxide, there is obtained 7H - tetradecafluoroheptyl 10H - eicosafluorodecyl ketone in admixture with bis(7H-tetradecafluoroheptyl) ketone and bis(10H-eicosafluorodecyl) ketone.

The products are not limited to those from esters of ω-hydropolyfluoroperhalomonocarboxylic acids, but also are inclusive of products from such esters and esters of the polyfluoroperhalopolycarboxylic acids. Depending on the reaction conditions involved and in particular on the relative molar proportions of the reactants used, several different products can be obtained from such mixtures. There can be obtained mostly the symmetrical diketones by reaction of two molar proportions of an ω-hydropolyfluoroperhalomonocarboxylic acid ester and one molar proportion of a perfluorodicarboxylic acid diester along with two molar proportions of the necessary alkali metal alkoxide. One the other hand, if equimolar proportions of a polyfluoroperhalodicarboxylic acid diester and an ω-hydropolyfluoroperhalomonocarboxylic acid ester are reacted in the presence of one molar proportion of an alkali metal alkoxide, then mostly a β-ketoester is obtained, along with the symmetrical mono- and diketones. Conversely, if one molar proportion each of two different ω-hydropolyfluoroperhalomonocarboxylic acid esters are reacted with one molar proportion of a polyfluoroperhalodicarboxylic acid diester in the presence of two molar proportions of the requisite alkali metal alkoxide, then several products are obtained, including the unsymmetrical diketone, the two symmetrical diketones from the monocarboxylic acid esters, the unsymmetrical diketone from the two monocarboxylic acid esters, and possibly in some instances the γ-ketoesters from the dibasic ester and one of each of the two monobasic esters.

Thus, to illustrate more specifically, when one molar proportion of dimethyl perfluoroadipate is reacted with two molar proportions of ethyl 3H-tetrafluoropropionate and two molar proportions of sodium methoxide, there are obtained the symmetrical diketones, i.e., mostly 1H,5H-octafluoro-3-pentanone and to a lesser extent 1H,10H-hexadecafluoro-3,8-decandione, as well as the ketoester, methyl 8H-dodecafluoro-6-ketooctanoate. On the other hand, when one molar proportion of dihexyl difluoromalonate is reacted with one molar proportion of 2-chloroethyl 3H-tetrafluoropropionate and one molar proportion of lithium ethoxide, an equilibrium mixture is obtained of the ketoester, i.e., hexyl 5H,2,2,4,4,5,5-hexafluoro-3-ketopentanoate, as well as the symmetrical ketone 1H,5H-octafluoro-3-pentanone and the symmetrical diketone 1H,7H-decafluoro-3,5-heptandione. Similarly, if one molar proportion of ethyl methyl perfluoroglutarrate is reacted with one molar proportion of ethyl perfluoropropionate and one molar proportion of methyl 7H-dodecafluoroheptanoate in the presence of two molar proportions of lithium methoxide, a mixture of several products is obtained, including the unsymmetrical diketone, i.e., 1-hydroperfluoro-7,11-tridecanedione, as well as the symmetrical ketones, perfluoro-3-pentanone, and 1H,13H-pentacosafluoro-7-tridecanone as well as the simple unsymmetrical ketone, i.e., 1H-dodecafluorohexyl perfluoroethyl ketone, and the mixed keto esters.

The present invention is generic to the acyclic ketals of the wholly carbon chain bis(ω-hydropolyfluoroperhalo)-ketones just described with monohydric compounds wherein all hydrogen replacements, other than the one hydroxyl, are halogen and this is fluorine when on carbon aliphatic in character, with the radical of at least one of the two monohydric moieties required having its free valence stemming from only singly bonded carbon. These new ketals are prepared by the reaction between a bis(ω-hydropolyfluoroperhalo)ketone, a monohydric alcohol, and an ester of a monohydric organic compound, i.e., a monohydric alcohol or a phenol, with a strong, oxygen-containing acid of sulfur, organic or inorganic, and a strong inorganic base. The esters of monohydric alcohols with the strong hydrohalic acids may also be employed to prepare these novel ketals in which instances a silver salt must also be present to effect the final ketal-forming reaction.

In forming these acyclic ketals there can be employed any monohydric alcohol ROH where the hydroxyl is alcoholic and joined to only singly bonded carbon and R is hydrocarbyl with any substituent, i.e., replacement for hydrogen, on nuclear carbon halogen and on carbon aliphatic in character fluorine. Thus, there can be employed in the process of this invention in the manner illustrated in the examples not only the alcohols of the examples but any alcohol as defined above including aliphatic alcohols, both saturated and unsaturated, e.g., stearyl alcohol, allyl alcohol, etc., and particularly the alkanols, especially the lower (1–6 carbon) alkanols; araliphatic alcohols, e.g., benzyl alcohol, p-chlorobenzyl alcohol, etc.; cycloaliphatic-substituted aliphatic alcohols, e.g., cyclohexylmethyl alcohol, etc.; alkaromatic-substituted aliphatic alcohols, i.e., alkaraliphatic alcohols, e.g., p-tolylmethyl alcohol, i.e., p-tolylcarbinol, etc.; cycloaliphatic alcohols, e.g., cyclohexanol, etc.; fluorine-substituted aliphatic and cycloaliphatic alcohols, e.g., 2,2,2-trifluoroethyl alcohol, and the telomer alcohols from polyfluoroolefins, e.g., 1,1,13-trihydroperfluorotridecanol, etc.

Any ester of a strong acid wherein any substituent on the carbon skeleton of the ester is halogen when on nuclear, i.e., aromatic, carbon and fluorine when on aliphatic carbon can be employed to prepare the ketals of the present invention including esters of the aliphatic alcohols, both saturated and unsaturated, with the strong hydrohalic acids, e.g., methyl iodide, ethyl iodide, allyl bromide, etc.; the araliphatic alcohol esters of the hydrohalic acids, e.g., benzyl bromide, etc.; the aliphatic alcohol half-esters of the strong oxygen-containing sulfuracids, e.g., methyl hydrogen sulfate, the cycloaliphatic alcohol half-esters of the strong oxygen-containing sulfur acids, e.g., cyclohexyl hydrogen sulfate, etc.; the aliphatic alcohol esters of the strong oxygen-containing sulfur acids, e.g., ethyl p-toluenesulfonate, etc.; the aryl esters of the strong oxygen-containing sulfur acids, e.g., phenyl p-toluenesulfonate, etc.

These novel acyclic ketals are prepared by direct condensation of the aforesaid bis(ω-hydropolyfluoroperhalo)-ketones and the necessary alcohols and strong acid esters in the presence of a strong inorganic base. The four reaction components can be used in substantially equimolar proportions. However, excesses of the latter three are generally used to facilitate reaction. The ester of the strong acid is generally not used in over 50% excess but the inorganic base can be present in amounts up to 100% excess or greater. The alcohol can be present in large excess and is frequently so used as a reaction medium, the excess portion thereof being simply an inert diluent. In some cases, if desired, excesses of the ketone can be used serving to remove any water formed during the reaction as the stable ketone hydrate.

The strong base can be present as such or in the form of a salt thereof wherein the anion, i.e., acid moiety, can be organic or inorganic, the only important criterion being that it be one of a weak acid, preferably weaker than the hemiketal of the bis(ω-hydropolyfluoroperhalo)ketone, i.e., the pKa of the acid, whose anion is in the salt, must be greater than about 4. Thus, there can be employed in the process of the present invention and in the manner disclosed in the examples above, carbonates, bicarbonates, hydroxides, oxides, cyanides, acetates, benzoates, etc. The alkali metal and alkaline earth metal bases are preferred because of their readier availability and greater reaction efficiency when the ketal-forming alcohol derivative is an ester of a strong oxygen-containing acid. The most common of these are the lithium, sodium, potassium, magnesium, calcium, strontium, and barium carbonates, bicarbonates, hydroxides and oxides, and acetates. When the ketal-forming ester is an ester of a hydrohalic acid, the necessary base must be silver oxide or a silver salt, with the anion as above.

The present invention is generic to the cyclic ketals of glycols, having a wholly carbon chain between the hydroxyls, in which the hydroxyls are joined by means of a bivalent organic radical in which any substituent is halogen of atomic number no greater than 53 and preferably no greater than 35 with the wholly carbon chain bis(ω-hydropolyfluoroperhalo)ketones described above. The present invention is also generic to the preparation of these cyclic ketals by the reaction of these bis(ω-hydropolyfluoroperhalo)ketones with the half-esters, with mono- and polybasic, organic and inorganic acids, of glycols wherein the hydroxyls are connected by a bivalent hydrocarbon radical, any substituent on which is a halogen of atomic number not greater than 53 and preferably not greater than 35. Because of greater reactivity in the ketal-forming reaction the half-esters of the glycols with the hydrohalic acids and the half-esters of the glycols with oxygen-containing acids, especially the strong oxygen-containing acids of the elements of group VI-A of the periodic table, especially those of sulfur, are preferred.

These cyclic ketal-forming glycol derivatives can be described by the following structural formula:

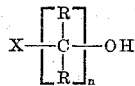

wherein the R's, which can be alike or different, are used to represent hydrogen, hydrocarbon (including aliphatic, aromatic, cycloaliphatic araliphatic, alkaromatic), halogen of atomic number no greater than 53, and preferably from 9 to 35, or halogenohydrocarbon where the halogen is as above; $n$ is used to represent a small, preferably plural, integer no greater generally than four and preferably two or three; and X is halogen of atomic number no greater than 53, and preferably from 9 to 35, or the neutral monovalent cation of a strong oxygen-containing acid, most preferably of sulfur, linked to the indicated carbon chain diradical through ester oxygen. The carbon chain diradical involved in these cyclic ketal-forming glycol derivatives, i.e.

corresponds to $R_z$ of the formula, above given, of the cyclic ketals of this invention and, with the two oxo atoms and the necessary 2-carbon therebetween forms the annulus of the 1,3-dioxo-2,2-(ω-hydropolyfluoroperhalocarbon)cycloalkanes of the present invention. Thus, the total number of ring members in these new compounds is three greater than $n$ (the number of chain carbons between hydroxyl and ester groups), i.e. $(n+3)$, which sum is generally of from five to seven carbons. Because of readier availability of the necessary intermediates the most preferred compounds are those where $n$ is 2 or 3, i.e., the dioxolanes and dioxanes, especially the former.

Any such glycol half-ester can be employed including not only those shown in the examples above but also: halohydride half-esters of alkylene glycols, e.g., 2-chloro-1-propanol, tetramethylenechlorohydrin, etc.; halohydride half-esters of aromatic-substituted alkylene glycols, e.g., β-phenyl-β-chloroethyl alcohol, etc.; halohydride half-esters of cycloaliphatic-substituted alkylene glycols, e.g., 1-hydroxymethylcyclohexyl chloride, etc.; halohydride half-esters of araliphatic-substituted alkylene glycols, e.g., β-benzyl-β-chloroethyl alcohol, etc.; halohydride half-esters of alkaromatic-substituted alkylene glycols, e.g., β-p-tolyl-β-chloroethyl alcohol, etc.; halohydride half-esters of halogen-substituted alkylene glycols, e.g., 2-bromo-1-bromo-methylethyl alcohol, etc.; halohydrin half-esters of cycloaliphatic glycols and substituted glycols, e.g., 2-chlorocyclohexanol, etc. etc.; half-esters of the above glycols and substituted glycols with the strong oxygen-containing acids, e.g., 2-hydroxyethyl methylsulfate, 2-hydroxyethyl p-toluenesulfonate, etc.

The new cyclic ketals are prepared by direct condensation of the aforesaid bis(ω-hydropolyfluoroperhalo)-ketones and the glycol half-ester in the presence of a base of the kind described in detail in the foregoing description of the acyclic ketal synthesis. These three reactants can be used in substantially equimolar proportions. However, excesses of the latter two are generally used to facilitate reaction. The ketal-forming glycol derivative is generally not used in over 50% excess but the basic reacting salt can be present in amounts up to 100% excess or greater.

Both ketal-forming reactions can be conducted in the presence or absence of an aqueous or wholly organic reaction medium. For reasons of increased yields, the reaction zone is preferably maintained under anhydrous conditions. In the case of the acyclic ketals since a molecule of water is formed during the reaction it is advantageous to also have present in the reaction zone a dehydrating agent, preferably an inert inorganic salt such as anhydrous magnesium sulfate, and the like. Excess ketone can serve the same purpose but is obviously more expensive.

Because of the necessarily present inorganic basic salt or salt-forming derivative and the salt formed during the reaction an inert organic diluent is generally present in both syntheses or is added as reaction proceeds in order to facilitate mixing of the various materials. Any inert liquid organic diluent can be used and, generally speaking, the most common are the normally liquid hydrocarbons and fluorohydrocarbons including the aliphatic and halogenated aliphatic compounds, e.g., the hexanes, the heptanes, the octanes, and the like; the various chlorinated aliphatic hydrocarbons, e.g., carbon tetrachloride, tetrachloroethylene, the chloropentanes, and the like; the aromatic and halogenated aromatic hydrocarbons such as benzene, toluene, the xylenes, chlorobenzene, and the like; the cycloaliphatic and halogenated cycloaliphatic hydrocarbons, e.g., cyclohexane, chlorocyclohexane, and the like; the hydrocarbon ethers, e.g., diethyl ether, the dibutyl ethers, and the like, as well as excesses of the alcohols as discussed before. The choice of the particular diluent is not at all critical, and will vary primarily with the reaction temperature found necessary. In the acyclic ketal synthesis use of excess of the reactant monohydric alcohol as the diluent is preferred.

The condensations are carried out at temperatures ranging from below 0° C. to generally no higher than 200° C., varying with the relative reactivity of the particular bis(ω-hydropolyfluoroperhalo)ketone and the particular ketal-forming derivatives being used. Thus, with the short-chain ketones, alcohols, and ketal-forming derivatives thereof having generally no more than a total of about six to eight carbons each the reaction will be carried out at temperatures from generally no lower than about −25° C. to about 50° C. Practically speaking, the reaction can be effected in most instances over the range 0–100° C.

The pressure at which reaction is carried out is largely immaterial and will vary, as will be apparent to those skilled in the art, with the specific nature of the reactants and the operating temperature being used, i.e., temperature and pressure are interdependent variables apparent for each particular system. Thus, if a lower boiling reactant is used and a higher reaction temperature is desired, efficient condensing means must be supplied to insure retention of that reactant in the reaction zone, or alternatively, the reaction must be carried out in a closed reactor under superatmospheric pressure.

After the initial condensation is effected, the precipitated inorganic salts can be removed from the reaction mixture by simple filtration, and the product can be isolated and purified by conventional procedures. A simple method of carrying out these same steps, particularly in those instances where a liquid organic diluent is used and the precipitated inorganic salts are water-soluble, is to treat the entire reaction mixture with an excess of water, whereby the salts dissolve in the aqueous layer and the organic material including the product remains in the organic layer. Simple separation of the latter, followed by distillation and/or crystallization, generally affords the desired ketals directly in high purity.

By proceeding according to the procedures above set forth and exemplified there can be obtained other acyclic ketals of the present invention. Thus, the methyl octadecyl ketal of 1H,5H-octafluoro-4-pentanon is obtained from the ketone, octadecyl alcohol, and methyl iodide; the allyl ethyl ketal of 1H,9H-hexadecafluoro-5-nonanone is obtained from the ketone, allyl alcohol, and ethyl iodide; the allyl benzyl ketal of 1H,13H,tetracosafluoro-7-tridecanone is obtained from the ketone, benzyl alcohol, and allyl bromide; the benzyl cyclohexylmethyl ketal of 1H,7H,dodecafluoro-3-heptanone is obtained from the ketone, cyclohexylmethyl alcohol, and benzyl bromide; the methyl p-tolylmethyl ketal of 1H,9H-hexadecafluoro-3-nonanone is obtained from the ketone, p-tolylmethyl alcohol, and methyl hydrogen sulfate; the dicyclohexyl ketal of 1H,11H-eicosafluoro-5-undecanone is obtained from the ketone, cyclohexanol, and cyclohexyl hydrogen sulfate; the ethyl 2,2,2-trifluoroethyl ketal of 1H,17H-dotriacontafluoro-8-heptadeconone is obtained from the ketone, 2,2,2-trifluoroethyl alcohol, and ethyl p-toluenesulfonate; the phenyl 1H,1H,13H-tetracosafluorotridecyl ketal of 1H,5H,octafluoro-3-pentanone is obtained from the ketone, 1H,1H,13H-tetracosafluorotridecanol, and phenyl p-toluenesulfonate; etc.

By employing the above described methods other cyclic ketals of the present invention can be made. Thus, 2,2-bis(ω-hydrotetrafluoroethyl)-4-methyl-1,3-dioxolane is obtained from 2-chloro-1-propanol and 1H,5H-octafluoro-3-pentanone; 2,2-bis(ω-hydrooctafluoro - n - butyl) - 1,3-dioxepane is obtained from tetramethylene chlorohydrin and 1H,9H-hexadecafluoro-5-nonanone; 2,2-bis(ω-hydrododecafluoro-n-hexyl)-4-phenyl-1,3-dioxolane is obtained from β-phenyl-β-chloroethyl alcohol and 1H,13H-tetracosafluoro - 7 - tridecanone; 2,2 - bis(ω-hydrotetrafluoroethyl)-4,4-pentamethylene-1,3-dioxolane (also identified as 2,2-bis(ω-hydrotetrafluoroethyl) - 1,3 - dioxaspiro[4.5] decane) is obtained from 1-hydroxymethylcyclohexyl chloride and 1H,5H-octafluoro-3-pentanone; 2-(β-hydrotetrafluoroethyl)-2-(γ-hydrooctafluoro - n - butyl)-4-benzyl-1,3-dioxolane is obtained from β-benzyl-β-chloroethyl alcohol and 1H,7H-dodecafluoro - 3-heptanone; 2-(β-hydrotetrafluoroethyl)-2-(ω - hydrododecafluoro-n-hexyl)-4-p-tolyl-1,3-dioxolane is obtained from β-p-tolyl-β-chloroethyl alcohol and 1H,9H-hexadecafluoro-3-nonanone; 2,2-bis(β-hydrotetrafluoroethyl)-1,3-dioxane is obtained from 3-bromo-n-propyl ethyl alcohol and 1H,5H-octafluoro-3-pentanone; 2-(ω-hydrooctafluoro - n - butyl)-2-(ω-hydrododecafluoro-n-hexyl) - 4,5 - hexahydrobenzo - 1,3-dioxolane (also identified as 3-(ω-hydrooctafluoro-n-butyl)-3-(ω-hydrododecafluoro-n-hexyl) - 2,4 - dioxabicyclo[3.4.0] nonane) is obtained from 2-chlorocyclohexanol and 1H,11H-eicosafluoro-5-undecanone.

These new ω-hydropolyfluoroperhaloketones and ketals are outstandingly chemically and thermally stable compounds ranging from high boiling liquids to solids, depending on the number of carbons therein. They distill without decomposition and possess most of the properties of the well-known stable fluorocarbons. However, these new ω-hydropolyfluoroperhaloketones and ketals exhibit one surprising difference in contrast to the unsubstituted perfluorocarbon compounds in that as a class they are readily soluble in organic solvents, such as ether, ethyl acetate, and methanol, and are readily recoverable therefrom unchanged; whereas, the corresponding unsubstituted polyfluorocarbon compounds, i.e., without the ketone or ketal functions, are well known to be insoluble in such systems. The desirable combination of high solubility and extreme chemical stability thus makes these compounds extremely useful.

The ω-hydropolyfluoroperhaloketones and the ketals thereof are insensitive to aqueous acids and, in fact, are stable to such strong acid conditions as concentrated sulfuric acid. The compounds show no reaction with various metals either in solvents or to the metal alone, including exposure at elevated temperatures. The new ω-hydropolyfluoroperhalocarbyl ketones and ketals, not only exhibit good chemical stability, but are also outstandingly resistant against thermal and oxidative degradation. Furthermore, they possess sufficiently high boiling points so as to make them of utility in certain so-called "stable liquid" outlets, e.g., as transformer fluids, as fluids for high-temperature power transmission or hydraulic systems, or for use in liquid coupled mechanical drives and the like where a particularly high degree of oxidative and hydrolytic stability is needed at elevated temperatures. These compounds are likewise outstandingly useful as heat transfer media, particularly in closed systems operating at relatively high temperatures such as found, for instance, in modern, high-pressure, high-temperature power generating equipment.

It is quite surprising that the difference between the perfluoroketones and the ω-hydroperfluoroketones, viz., the single terminal hydrogen in each radical pendent on the ketone carbonyl, affords such a significant difference in the physical properties of the compounds. The boiling point difference in otherwise identical compounds is as high as 50–70° C. in terms of boiling point at atmospheric pressure. Thus, perfluoro-3-pentanone boils at 27° C. at atmospheric pressure; whereas, 1H,5H-octafluoro-3-pentanone boils at 73° C. at atmospheric pressure. Similarly, perfluoro-4-heptanone boils at 76° C. at atmospheric pressure; whereas, 1H,9H-hexadecafluoro-5-nonanone boils at 147° C. at atmospheric pressure. For operation at higher temperatures as power transmissions or heat transfer agents, the ω-hydro compounds are preferred to perfluorinated compounds of corresponding carbon content.

The longer chain ω-hydroperfluoroketones, i.e., longer than about twenty chain carbons, are normally solids at room temperature and, as such, are not normally thought of as useful stable liquids. However, for those systems which usually operate at elevated temperatures, these materials behave as perfectly suitable liquids for the usual heat transfer or power transmission needs.

Another surprising difference in physical properties between the ω-hydroperfluoro- and the perfluoroketones is the surprising increase in the refractive indices thereof afforded by the presence of the single terminal hydrogen in each radical pendent on the ketone carbonyl, such refractive indices differing by as much as 0.20 unit under normal conditions. Thus perfluoro-3-pentanone exhibits an $n_D^{25}$ too low to be read on a conventional refractometer; whereas, 1H,5H-octafluoro-3-pentanone exhibits an $n_D^{25}$ of 1.3094. Similarly, perfluoro-4-hepatanone exhibits an $n_D^{25}$ too low to be measured on a conventional refractometer (but estimated at 1.2680); whereas, 1H,9H-hexadecafluoro-5-nonanone exhibits an $n_D^{25}$ of 1.3092.

Finally, the perfluorinated ketones are only soluble to a limited extent in organic solvents; whereas, the ω-hydroperfluoroketones are much more soluble, thereby making them of obviously greater utility as carriers or solvents in organic reaction systems. Thus, perfluoro-4-heptanone is soluble only to a relatively low extent under normal conditions in such conventional organic media as acetone and dimethyl sulfoxide. On the other hand, the corresponding ω-hydroperfluoroketone, i.e., 1H,9H-hexadecafluoro-5-nonanone, is completely miscible in these same media under normal conditions.

The new acyclic and cyclic ketals of the bis(ω-hydropolyfluoroperhalo)ketones are markedly different from previously known ketals, even including those of perhalogenoketones. The differences are fundamental, extending even to the possible modes of preparation of the ketals. Thus, the conventional routes to cyclic ketals, e.g., the direct interaction of a glycol with a ketone or the interaction of an orthoester and a ketone using strong acid catalysts such as hydrogen chloride, p-toluenesulfonic acid and the like—see methods 192 and 130, page 261–264, Wagner and Zook, "Synthetic Organic Chemistry," Wiley, 1953—do not result in the formation of the desired ketals from the present ketones.

Conversely, when the ketalization method found necessary for the ketals of the present invention, i.e., ketalization under basic conditions is applied to somewhat similar haloketones, including the perhaloketones, wherein the carbons immediately linked to the carbonyl carbon do not have bonded thereto the necessary fluorine substituent, no ketals are obtained. Thus, when hexachloroacetone and ethylene chlorohydrin were mixed at 0° C., treated with solid potassium carbonate, stirred and extracted, all in the detailed manner illustrated in the foregoing examples, no 2,2-bis(trichloromethyl)-1,3-dioxolane, i.e., the cyclic ketal, was obtained. The only product which could be isolated was the β-chloroethyl ester of trichloroacetic acid as a clear, colorless liquid, boiling at 57° C. under a pressure corresponding to 0.2 mm. of mercury; $n_D^{25}$, 1.4782.

Analysis.—Calculated for $C_4H_4O_2Cl_4$: C, 21.30%; H, 1.80%; Cl, 62.8%. Found: C, 22.10%; H, 2.00%; Cl, 62.7%.

Thus, when the ketone does not have necessary fluoro-substituent on each α-carbon, the necessary basic synthesis fails, and only products arising from haloform cleavage result.

Similarly conventonal routes to acyclic ketals, e.g., the direct interaction of an alcohol with a ketone or an orthoester with a ketone, using the conventional strong acid catalysts, such as hydrogen chloride, p-toluenesulfonic acid, and the like, do not result in the formation of the desired ketals from the present ketones. Conversely, when the ketalization method found necessary for the ketals of the present invention (i.e., ketalization under basic conditions as explained in detail in the foregoing and illustrated specifically in the examples) is applied to the superficially similar halogenoketones, even including the perhalogenoketones, wherein the carbons immediately linked to the carbonyl carbon are free of the necessary at least one fluorine substituent, no ketals or even hemiketals are obtained.

Most surprising properties of the new ketals of the present invention are their extreme chemical and physical stability, and especially their extreme hydrolytic stability. In general ketals are extremely sensitive to aqueous acid with ready hydrolysis to the starting aldehyde and alcohol. Thus, in the preparation of ketals according to Wagner and Zook, supra, the various acidic catalysts must be very carefully neutralized or otherwise removed before the necessary continuing aqueous workup, otherwise the ketals would not be obtained. In surprising contrast, the present ketals show substantially no reaction with aqueous acids even at elevated temperatures.

The terms "strong acid," "strong base," "weak acid," are used in their common meaning as set forth for example in Pauling, "General Chemistry" (2nd edition, Freeman, San Francisco, 1953), pp. 441, 455, and the term "alcohol radical" as used in the Patent Office sense as set forth in Classification Manual 200. The term "substituent" is used herein in its ordinary sense to indicate a replacement for hydrogen on carbon.

Since obvious modifications in the invention will be apparent to those skilled in the chemical arts, I propose to be bound solely by the appended claims.

The embodiments of the invention in which an exclusive property or privilege is claimed are defined as follows:

1. $\omega,\omega'$ - Dihydropolyfluoroperhaloalkanone in which the halogens are of atomic number from 9 to 17, inclusive, and which have at least two chain carbons in each radical pendent on ketone carbonyl, each of which radicals is of 2 to 31 carbons, the two extra-chain valences of the $\alpha$-carbons of the aforesaid radicals being satisfied solely by members of the group consisting of fluorine and perfluorocarbon radicals.
2. Ketones of claim 1 wherein each alpha carbon carries two fluorines.
3. 1,9-dihydroperfluoro-5-nonanone.
4. 1,5-dihydroperkuoro-3-pentanone.
5. 1,17-dihydroperfluoro-9-heptadecanone.
6. 1H,21H-tetracontafluoro-11-heneicosanone.
7. Ketals of ketones of claim 1 wherein each oxygen is attached to a monovalent member of the group consisting of hydrocarbon and halohydrocarbon, wherein no halogen is of atomic number greater than 17, radicals of 1–18 carbons.
8. 1H,21H - tetracontafluoro - 11 - heneicosanone dimethyl ketal.
9. Cyclic ketals of ketones of claim 1 wherein the two oxygens are attached to a divalent member of the group consisting of hydrocarbon and halohydrocarbon, wherein no halogen is of atomic number greater than 17, radicals of 1–12 carbons with 1–4 carbons between the two oxygens.
10. 2,2 - bis(8H - hexadecafluoro - n - octyl) - 1,3-dioxolane.

References Cited in the file of this patent

UNITED STATES PATENTS

| | | |
|---|---|---|
| 2,433,844 | Hanford | Jan. 6, 1948 |
| 2,802,034 | Hauptschein | Aug. 6, 1957 |
| 2,901,514 | Drysdale | Aug. 25, 1959 |

FOREIGN PATENTS

| | | |
|---|---|---|
| 583,874 | Great Britain | Jan. 1, 1947 |
| 753,304 | Great Britain | July 25, 1956 |

OTHER REFERENCES

McBee et al.: J. Am. Chem. Soc., vol. 75, pages 3152–3153 (1953).

R. N. Haszeldine et al.: J. Chem. Soc. (London), pp. 3005–3009 (1955).

Rausch et al.: WADC Technical Report, 56–94 (May 1956).